April 12, 1966    C. A. STANDING ETAL    3,245,732
FIFTH WHEEL FOR TRAILERS AND THE LIKE
Filed June 11, 1964

INVENTORS
Charles A. Standing and
BY Harold H. Bailey
Frease, Bishop, John & Schick
ATTORNEYS

United States Patent Office 3,245,732
Patented Apr. 12, 1966

3,245,732
FIFTH WHEEL FOR TRAILERS AND THE LIKE
Charles A. Standing, 1079 W. Ely St., Alliance, Ohio, and Harold H. Bailey, 3364 Porter Road, New Milford, Ohio
Filed June 11, 1964, Ser. No. 374,366
2 Claims. (Cl. 308—136)

The invention relates to fifth wheels and more particularly to a novel construction of fifth wheel in which lubricant may be retained and protected against the admission of dirt or moisture.

An object of the invention is to provide a fifth wheel in which a circular channel extends upward from the lower fifth wheel member, and a circular projection or arcuate projections depend from the upper fifth wheel member and slidably bear upon the lower fifth wheel member within said channel, the channel containing lubricant, and means being provided for preventing moisture or dirt from entering the channel.

Another object of the invention is to provide a fifth wheel of the character referred to in which circular shields depend from the upper fifth wheel member adjacent the outer and inner perimeters of the channel.

A further object of the invention is to provide such a fifth wheel especially adapted for use upon trailers with steerable wheels.

A still further object of the invention is to provide a fifth wheel of this type in which the circular channel upon the lower fifth wheel member is divided by radial partitions into semicircular or arcuate portions, each receiving an arcuate projection depending from the upper fifth wheel member.

The above objects together with others which will be apparent from the drawing and following description, or which may be later referred to, may be attained by constructing the improved fifth wheel in the manner hereinafter described in detail and illustrated in the accompanying drawing, in which.

Reference is now made more particularly to the construction illustrated in the drawing, in which similar numerals refer to similar parts throughout.

Although the invention is applicable to fifth wheels for various uses, for the purpose of illustration it is shown applied to fifth wheels for trailers with steerable wheels, of the general type shown in our prior Patent No. 3,044,795, dated July 17, 1962.

Figure 1:
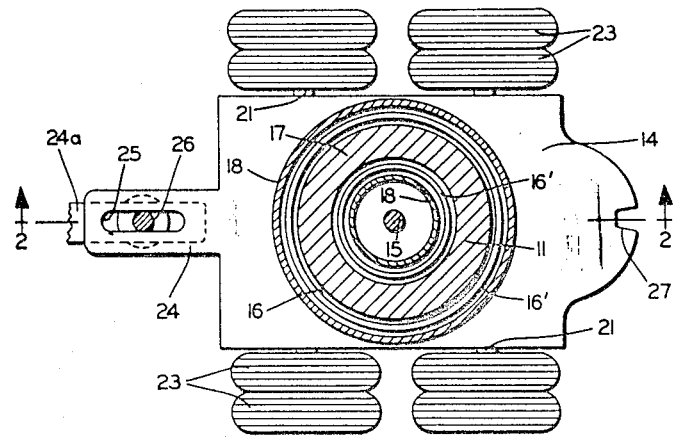
FIG. 1 is a horizontal sectional view of a fifth wheel embodying the invention, taken on the line 1—1, FIG. 2.
Figure 2:
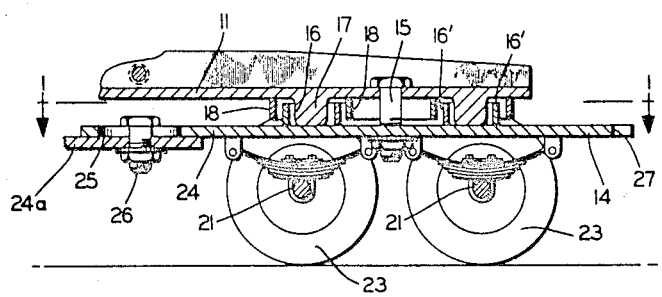
FIG. 2 is a vertical sectional view through the fifth wheel taken on the line 2—2, FIG. 1.

Referring first to the embodiment of the invention shown in FIGS. 1 and 2, a fifth wheel is shown comprising the upper member 11 and the lower member 14, pivotally connected together by the king pin 15.

An annular channel 16 is formed upon the lower fifth wheel member 14, by means of the spaced concentric flanges 16' extending upwardly from the surface thereof. The upper member 11 has a depending circular projection 17, received within the channel 16, between the annular flanges 16' and having a flat lower surface slidably bearing upon the top of the lower member 14, as best shown in FIG. 2.

The channel 16 should be filled to a proper height with a suitable lubricant, such as transmission oil, or the like, so as to reduce friction and wear between the two members of the fifth wheel.

In order to provide a shield to prevent water or mud from splashing into the channel 16 and diluting or contaminating the lubricant therein, annular flanges 18 depend from the upper member 11, adjacent the annular flanges 16' of the channel 16, and extend to a point near the lower member 14. Thus, the channel 16 is entirely protected from any water, mud or other dirt or foreign matter, and the lubricant within the channel 16 is preserved.

As in our prior Patent No. 3,044,795 above referred to, the lower member 14 may have axles 21 connected thereto upon which are mounted wheels 23. Also, as shown in said prior patent, a slotted bar 24 with slot 25 therein may be formed at one end of the lower member 14 for pivotal connection to a similar bar 24a on the lower member of a similar fifth wheel as by the pivot pin 26.

The other end of the lower member 14 may be provided with a notch 27, as shown in the patent. However, these elements form no part of the present invention and may be eliminated as the invention is applicable not only to fifth wheels of the type shown in the patent, but to various other types of fifth wheels or turntables.

Figure 3:
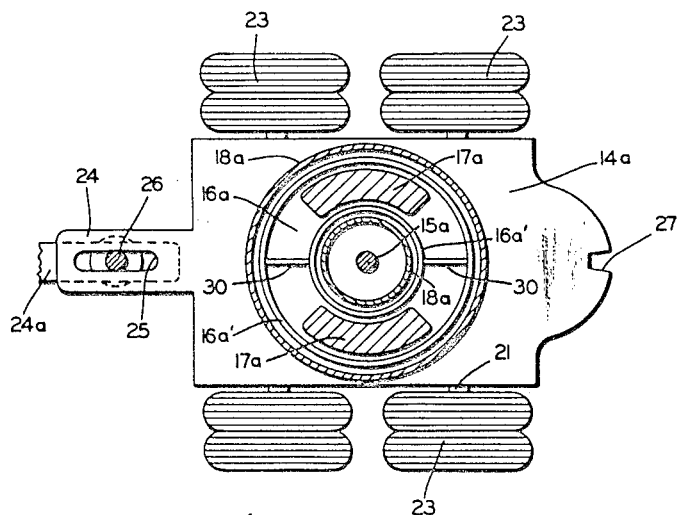
FIG. 3 is a horizontal sectional view, similar to FIG. 1, of a modified embodiment of the invention.

In FIG. 3 is shown a modified embodiment of the invention in which the upper member of the fifth wheel has spaced arcuate projections depending therefrom and received within arcuate or semi-circular channels upon the lower fifth wheel member, in the general manner disclosed in our prior patent above referred to.

The lower member 14a of the fifth wheel has the arcuate or semi-circular channel 16a formed thereon by means of the concentric circular flanges 16a' extending upwardly therefrom, the radial partitions 30, between the flanges 16a', dividing the same into two semi-circular channels.

The upper member of the fifth wheel (not shown) may be the same as shown in FIG. 2 and is connected to the lower member by the king pin 15a. A pair of arcuate projections 17a depend from the upper member of the fifth wheel and extend into the corresponding semi-circular channels 16a, having a sliding bearing upon the top of the lower member 14a within said channels. Suitable lubricant is placed in the channels 16a in the manner above described.

For the purpose of preventing mud, water or other foreign matter from entering the channels 16a, annular shields 18a depend from the upper member of the fifth wheel, adjacent the outer and inner sides of said channels and extend to a point adjacent the lower member, in the manner shown in FIG. 2. Otherwise, the construction of the embodiment of FIG. 3 may be the same as shown in FIGS. 1 and 2 and above described in detail.

With the above construction it will be seen that a fifth wheel is provided in which there is a lubricated sliding bearing between the upper and lower members of the fifth wheel with means for shielding the same so as to prevent mud, water or other foreign matter from coming in contact therewith and diluting or contaminating the lubricant.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

We claim:

1. A fifth wheel construction comprising an upper member, a lower member, a king pin pivotally connecting said members together, said upper member and lower member both being imperforate except at the points through which the king pin is located, an annular channel on the lower member concentric with said king pin, said channel comprising a flat bottom wall and concentric annular flanges extending upward from the lower member, the upper edges of said annular flanges being spaced from the upper member, an annular projection depending from the upper member and having a flat lower surface slidably bearing upon the flat bottom wall of said channel, the inner and outer perimeters of said annular projection being spaced from said annular flanges throughout their entire heights whereby the annular channel forms an oil reservoir, and shield means comprising concentric annular flanges depending from the upper member adjacent the outer and inner perimeters of said channel but not in contact therewith.

2. A fifth wheel construction comprising an upper member, a lower member, a king pin pivotally connecting said members together, said upper member and lower member both being imperforate except at the points through which the king pin is located, arcuate channels on the lower member concentric with the king pin, each of said channels including a flat bottom wall and concentric arcuate flanges extending upward from the lower member, the upper edges of said annular flanges being spaced from the upper member, arcuate projections depending from the upper member and having flat lower surfaces slidably bearing upon the flat bottom walls of said channels, the inner and outer perimeters of said arcuate projections being spaced from said arcuate flanges throughout their entire heights whereby the arcuate channels form oil reservoirs, and shield means comprising concentric annular flanges depending from the upper member adjacent the outer and inner perimeters of said channels but not in contact therewith.

References Cited by the Examiner

UNITED STATES PATENTS

| 540,162 | 5/1895 | Henley | 280—136 |
| 1,130,538 | 3/1915 | Rader | 308—221 |
| 2,588,078 | 3/1952 | Black | 280—125 |
| 3,044,795 | 7/1962 | Standing et al. | 280—81 |

LEO FRIAGLIA, *Primary Examiner.*